(12) United States Patent
Li et al.

(10) Patent No.: US 7,146,070 B1
(45) Date of Patent: Dec. 5, 2006

(54) WIDE STEERING-RANGE MOTIONLESS OPTICAL BEAM STEERING DEVICE, AND METHODS OF MANUFACTURE

(75) Inventors: Le Li, Hopewell Junction, NY (US); Haiping Yu, Hopewell Junction, NY (US); Ben Y. Tang, Wappingers Falls, NY (US); Zhan Chen, Carrollton, TX (US)

(73) Assignee: Kent Optronics Inc., Kent, OH (US)

( * ) Notice: Subject to any disclaimer, the term of this patent is extended or adjusted under 35 U.S.C. 154(b) by 168 days.

(21) Appl. No.: 10/687,682

(22) Filed: Oct. 18, 2003

Related U.S. Application Data

(60) Provisional application No. 60/419,492, filed on Oct. 18, 2002, provisional application No. 60/335,074, filed on Oct. 26, 2001.

(51) Int. Cl.
*G02B 6/35* (2006.01)
*G02B 26/08* (2006.01)

(52) U.S. Cl. ......................................... 385/18; 385/129
(58) Field of Classification Search .................. 385/18
See application file for complete search history.

(56) References Cited

U.S. PATENT DOCUMENTS 6,424,755 B1 * 7/2002 Clapp ............................. 385/3
6,559,921 B1 * 5/2003 Leslie et al. ................. 349/196

* cited by examiner

*Primary Examiner*—Michelle Connelly-Cushwa
*Assistant Examiner*—Jerry T Rahll
(74) *Attorney, Agent, or Firm*—Rodney T. Hodgson

(57) ABSTRACT

Electro-optically operated transmitters containing a wave guide liquid crystal beam steering device in series of fine beam steering devices as well as electrically switchable mirror are disclosed. The wave guide beam steering device is constructed on a planar lightwave circuit that contains a plurality of liquid crystal switching elements intersecting a plurality of optical wave guides and one main wave guide that has a curvature for light propagation. The transceiver is capable of continuously steering multiple beams of light into separate independent directions with a field-of-regard close to $4\pi$. The resulted optical transmitter device is motionless, polarization sensitive or insensitive, stable within the operational spectral region, and stable versus temperature. When an optical receiver is integrated, the transmitters become transceivers. The invention also includes the methods for manufacturing the wave guide beam steering device.

39 Claims, 10 Drawing Sheets

106

WIDE STEERING-RANGE MOTIONLESS OPTICAL BEAM STEERING DEVICE, AND METHODS OF MANUFACTURE

CROSS REFERENCE TO RELATED APPLICATIONS

Reference is made to and priority claimed from U.S. provisional application Ser. 60/335,074 filed on Oct. 26, 2001, and U.S. application Ser. No. 10/281,538, filed on Oct. 28, 2002 entitled "OPTICAL SWITCHES MADE BY NEMATIC LIQUID CRYSTAL SWITCHABLE MIRRORS, AND APPARATUS OF MANUFACTURE", and U.S. provisional application Ser. No. 60/419,492, filed on Oct. 18, 2002, entitled "WIDE STEERING-RANGE MOTIONLESS OPTICAL BEAM STEERING DEVICE, AND METHODS OF MANUFACTURE".

BACKGROUND OF THE INVENTION

1. Field of the Invention

The present invention relates generally to a motionless wide steering-range optical transmitter device comprising core planar wave guide based liquid crystal beam steering device(s) in series of state-of-the-art fine steering device(s) for simultaneously steering multiple beams of light into arbitrary and separate directions with a field of regard close to $4\pi$.

2. Description of the Prior Art

Optical beam steering devices, also termed as optical transmitters thereinafter, are critical devices for applications in wireless optical communication, image transferring, and remote measurement. A beam steering or transmitter device is such a device that alters or scans the propagation direction or position of a beam of light via a certain controlling means. Current state-of-the-art beam steering technologies include at least the following categories, i.e., electro-mechanical, electro-optical, electro-acoustic, and thermo-optical. A typical electromechanical beam steering device (BSD) is Gimbal based beam steering device that steers beam of light via mechanically rotating the gimball (Robert A. Gill and Robert J. Feldmann, "Development of Laser Data Link for Airborne Operations", http://www.dodccrp.orz/Proceedings/DOCS/wcd00000/wcd00099.htm).One single gimball BSD steers one beam of light over a wide solid angle in the sequence manner at a relatively slow speed.

Microelectromechanical system (MEMs) based beam steering device is another type of electromechanical device (Hung Nguyen, John Guo-Dung Su, Hiroshi Toshiyoshi, and Ming C. Wu, "Device Transplant of Optical MEMS For Out Of Plane Beam Steering", MEMs 2001; B. Mukherjee, "Optical Communication Networks", U C Davis, ECS Lecture 259 2b, 2002). MEMs technology employs micromirror or micro-mirror array to deflect beam of light for steering and has advantages of relatively fast speed, compact size, and reasonable steering range.

Electro-acoustic beam steering device is a stationary BSD which steers beam of light via light diffraction from the medium grating generated within the acoustic medium by the acoustic wave from the transducer (Benjamin L. Brown, "MULTI-BEAM FAST-STEERED TWEEZERS"; http://atomsun.harvard.edu/tweezer/multi.html; www.isomet.com/FinalWebSite/PDFDocs/AO%20Sheets/1250C-2BS-943.pdf; Acoustic BSD-2; Andrea Fusiello and Vittorio Murino, "Calibration Of An Optical-Acoustic Sensor", Machine Graphics & Vision, Vol. 9, P.207, 2000). Electro-acoustic BSD randomly steers beam of light fast and consumes significant electric power with limitations in beam programmability.

Electro-optical beam steering devices include liquid crystal (LC) optical phased array beam steering device (LCOPA BSD) (Paul McManamon, Terry A. Dorschner, david L. Corkum, Larry J. Friedman, Douglas S. Hobbs, Nichael Holz, Sergey Liberman, Huy Q. Nguyen, Daniel P. Seler, Richard C. Sharp, and Edward A. Watson, "Optical Phasded Array Technology", Proc. IEEE, Vol. 84, 268, 1996; Phil Bos, "Liquid crystal Based Optical Phased Array For Steering Lasers", STAB-Kickoff meeting, August, 2000), liquid crystal spatial light modulator (SLM) based beam steering device (Bruce Winker, "Liquid Crystal Agile Beam Steering", STAB-Kickoff meeting, August, 2000), liquid crystal blazed grating based beam steering device (Xu Wang, Daniel Wilson, Richard Muller, Paul Maker, and Demetri Psaltis, "Liquid-crystal blazed-grating beam deflector", Appl. Opt., Vol. 39, P.6545, December 2000), as the typical examples.

In LCOPA BSD, a phase profile is imposed on an optical beam as it is either transmitted through or reflected from the phase shifter array. The imposed phase profile steers the beam of light. The array of optical phase shifters is realized through lithographic patterning of an electrical addressing network on the superstrate of a liquid crystal waveplate. Refractive index of the liquid crystal changes sufficiently large to realize full-wave differential phase shifts can be effected using low voltages applied to the liquid crystal phase plate electrodes.

Liquid crystal blazed grating based beam steering device comprises a substrate having a Poly(methyl methacrylate) (PMMA) blazed grating and a thin layer of nematic liquid crystal (LC) sandwiched in between the grating substrate and plane substrate, both of which have Indium-Tim-Oxide (ITO) electrodes. The electric field applied to the ITO electrodes electrically drives the LC to change the phase information of the illuminating light, or the refractive index for extraordinary light. In the absence of the electric field, the refractive indices of the PMMA substrate and LC are different, and strong diffraction is produced by the refractive index-phase difference of this OFF state. When an electric field is applied, the refractive index of the LC is decreased to a certain point where index matching occurs between the PMMA and the LC. Light passes through the device without changing its propagation direction.

Electro-optical beam steering devices based on optical wave guide have been invented. For example, in the device invented by Lin Sun, et al ("Polymeric waveguide prism-based electro-optic beam deflector", Opt. Eng. 40(7), 1217–1222 (July 2001), optical beam is deflected via the principle that based on the fact that the propagation direction of the light beam can be changed by inducing an index pattern in the EO medium by applying an electric field. The triangular structure of the top electrode induces a triangular variation of index in the core layer made of EO polymeric material. Light propagating through the deflector deviates from its original path at the interfaces between adjacent regions, because of the difference in the indices of refraction. A light beam propagating within the planar wave guide formed by the polymer layers will thus have its direction of propagation modified in a manner similar to that of a beam passing through a set of physical prisms.

Another example of electro-optical switching/steering device in wave guide format is the polarization sensitive optical switch/beam steering prototypes designed and realized based on liquid crystal (LC) integration in planar wave guides (http://people.na.infn.it/~abbate/gruppo/ Waveguides.htm). Different geometries was exploited and both nematic and ferroelectric liquid crystals (FLC) was used, but the operation principle was always the same: a liquid crystal cell is realized in place of the waveguide core or cladding; a weak applied voltage (few Volts) is able to reorient liquid crystal (LC) molecules, change the layer refractive index and affect light propagation. As an particular example, a rectangular basin, as deep as core film and rotated with respect to the direction of light propagation, is etched on the waveguide by ordinary photolithography. It was proposed to fill the basin with a ferroelectric liquid crystal, which offers faster response time (in the ms range) than ordinary nematic liquid crystals. Right alignment is assured by a rubbed polymeric layer deposited on lower surface of a glass cover. FLC is chosen so that, with no applied voltage, its refractive index coincides with core one and a transmission state is obtained; switching on electric field, LC refractive index becomes lower so that total reflection takes place at core-basin interface and beam deflection is obtained. This device is polarization sensitive.

As an example of thermo-optical switching/steering device in wave guide format, polarization insensitive planar-waveguide switch employing liquid crystal as the switching elements has been disclosed by John Thackara ("Planar Waveguide Switch and Optical Cross—Connect, WO 02/31558, International Publication Date: 18 Apr., 2002). Different from the mentioned electro-optical device, this device switches beam of light via thermal means rather than electric means. This switching device is also regarded as a beam steering device from which the steered beam steered has the same propagation direction. The core layer of the switch's planar waveguide contains a narrow trench filled with a liquid crystal that exhibits positive birefringence. When held at a temperature that is a few degrees above a threshold value (or "clearing point"), the liquid crystal's isotropic refractive index matches that of the core layer, allowing nearly complete optical transmission through the switch. Cooling the liquid crystal temperature to below the clearing point, however, both polarizations of the incident optical signal are totally reflected from the trench.

Most these state-of-the-art beam steering devices are effective in steering single beam of light.

SUMMARY OF THE INVENTION

The present invention describes a motionless wide range multi-beam optical beam steering device and the methods for manufacturing the said beam steering device. Such device is also termed as optical "Transmitter" thereafter in the application. Furthermore, if an optical receiver is integrated, it is also termed as "Transceiver". The centerpiece of this transmitter is a planar wave guide based wave guide digital steering device (termed as "planar wave guide beam steering device (WG-BSDI)" thereafter) that employs wave guide switching element for deflecting light beam. Similar to the prior-art planar waveguide switch employing liquid crystal as the switching elements as disclosed by John Thackara ("Planar Waveguide Switch and Optical Cross-connect, WO 02/31558, International Publication Date: 18 Apr., 2002), one of the preferred configurations of the WG-BSD in the present invention steers efficiently randomly polarized beam of light. However, the steering operation is realized electrically by changing the liquid crystal refractive index via electric means rather than thermal means. In an alterative design, this WG-BSD is capable of efficiently steering a polarized beam of light by electric means.

When in series with state-of-the-art fine steering device(s) together with the switchable mirrors made from cholesteric liquid crystal and telescope, the wave guide beam steering device becomes a complete steerable optical transmitter that is capable of steering beam of light into arbitrary directions with a field of regard close to $4\pi$. When the steerable optical transmitter further comprises of multiple wave guide beam steering devices preferably in stack configuration and plurality of fine beam steering devices and plurality of switchable mirrors, the optical transmitter is capable of simultaneously and independently steering multiple beams of light into arbitrary and separate directions within a field of regard close to $4\pi$, which is another differentiating character from the prior-arts.

The wave guide switching element in the WG-BSD of the present invention consists of one incoming wave guide intersecting at least one out-going wave guide and a liquid crystal trench located at the intersection of the wave guides. The switching mechanism is based on the electrically induced refractive index change of the liquid crystal material within the wave guide switching element, which further causes an incident light on the liquid crystal interface to be either totally reflected or transmitted regardless of the light polarization state. In one state, the liquid crystal is set in the isotropic phase in the absence of an electric field with a refractive index $n_{iso}=[(n_e^2+2n_o^2)/3]^{1/2}$, where $n_o$ and $n_e$ are ordinary and extraordinary refractive index of the liquid crystal, respectively. $n_{iso}$ is larger than $n_o$ but smaller than $n_e$. If $n_{iso}$ of the liquid crystal is chosen to match that of the surrounding medium such as a glass substrate, all the polarization components of the light are transmitted since $n_{iso}$ is optically isotropic. In another state when an electric field is applied to the liquid crystal, the liquid crystal at the temperature above the clearing point is reoriented into a so-called electric field-forced nematic phase due to its positive and non-zero dielectric anisotropy $\Delta\epsilon$. The longer axis of the liquid crystal molecules is required to be aligned as close as possible to the propagation direction of the incident light. Under this situation, the "P" polarized light sees an ordinary index $n_o$ while "S" polarized light sees an effective refractive index $n_{eff}$ of the liquid crystal If the light is incident onto the liquid crystal surface at a large oblique angle, this $n_{eff}$ becomes slightly larger than no but still smaller than $n_{iso}$. Therefore, if the incident angle of the beam from the wave guide is greater than the critical angle for total internal reflection for both polarizations, a randomly polarized beam is deflected via total internal reflection at the interface between the liquid crystal and wave guide. One preferred liquid crystal is nematic liquid crystal although other liquid crystals such as cholesteric liquid crystal (also called chiral nematic) and smectic liquid crystal are also useable.

In one preferred embodiment, the planar wave guide beam steering device (WG-BSD) in the present invention consists of a planar light wave circuit (PLC) that further comprises ring-shaped wave guide along which there is a plurality of the wave guide switching elements attached as well as coupling wave guides for coupling beam of light into and out of the ring-shaped wave guide. The beam of light can be a laser beam from a source laser that is first coupled into the ring-shaped wave guide and becomes a wave guided laser beam propagating along the ring-shaped wave guide until one of the wave guide switching elements is electrically switched so that the wave guided beam is deflected from the ring-shaped wave guide into the out-going coupling wave guide from which it is further coupled out of the planar wave guide beam steering device to become a freely traveling laser beam. Since the wave guide switching elements are discretely distributed along the ring-shaped wave guide, this planar wave guide beam steering device is regarded as a digital beam steering device for coarse beam steering.

In order to realize continuous laser beam steering over the whole 360° angular range within the azimuth plane that is perpendicular to the surface normal of the wave guide beam steering device, state-of-the-art fine beam steering devices are implemented. The optical axis of the fine beam steering device is such oriented that the fine beam steering device provides a continuous steering of a laser beam over an angle of $\pm\phi$ within the azimuth plane. One exemplary fine beam steering device is liquid crystal optical phase arrayed beam steering device (LCOPA BSD). In general, multi-staged fine beam steering devices are required n order to extend the continuous steering angular range $\phi$. The fine beam steering device(s) is preferably arranged surrounding the planar wave guide beam steering device. Properly choosing the number of the discrete wave guide switching elements in the WG-BSD as well as the stages of the fine beam steering device realizes the continuous steering of the laser beam over the whole 360° azimuth angle in the far field.

In order to realize continuous laser beam steering in elevation direction, additional state-of-the-art fine beam steering device is integrated whose optical axis is orthogonal to the first fine beam steering device. Such an integrated device has an elevation steering angle of $\phi_{ele}$. The fine beam steering device(s) is also preferably arranged around the planar wave guide beam steering device. Similarly, in order to extend the elevation steering angle, multiple stages of the fine beam steering devices are required.

An alternative approach to increasing the elevation steering angle $\phi_{ele}$ without using more stages of the fine beam steering devices is to incorporate a switchable mirror surrounding the fine beam steering device. By properly arranging the switchable mirror angular orientation with respect to the fine beam steering device(s), the elevation steering angle $\phi_{ele}$ can be doubled to $\pm 2\phi_{ele}$.

In numerous applications, a transmitter capable of emitting and steering/scanning multiple beams of light is desired that is compact and lightweight. Such a multi-beam transmitter can be realized by incorporating multiple WG-BSDs preferably in stack and a plurality of fine steering devices for both horizontal (in azimuth plane) and elevation steerings.

It is therefore an object of this invention to provide a planar wave guide liquid crystal beam steering device (WG-BSD) comprising wave guide switching elements that are electro-optical operated and are insensitive to light polarization.

Another object of the present invention is to provide a transmitter comprising the planar wave guide beam steering device and the fine beam steering device such that the transmitter is capable of continuously steering a beam of light over the full 360° within the azimuth plane.

Yet another object of the present invention is to provide another transmitter comprising the planar wave guide beam steering device, the fine beam steering device for horizontal steering and the fine beam steering device for elevation steering such that the transmitter is capable of continuously steering a beam of light over the full 360° within the azimuth plane and $\phi_{ele}$ in elevation where $\phi_{ele}$ is the steering angle provided by the fine beam steering device(s) for elevation steering.

Yet another object of the present invention is to provide a switchable mirror to double the elevation steering angle of the transmitter.

Yet another object of the present invention is to provide another transmitter comprising the planar wave guide beam steering device, the fine beam steering device for horizontal steering, the fine beam steering device for elevation steering, and switchable mirror such that the transmitter is capable of continuously steering a beam of light over the full 360° in the azimuth plane and $\pm 2\phi_{ele}$ in elevation.

Yet another object of the present invention is to provide another transmitter comprising multiple planar wave guide beam steering devices in stack, a plurality of the fine beam steering devices for horizontal steering, a plurality of the fine beam steering device for elevation steering, and a plurality of switchable mirrors such that the transmitter is capable of independently, simultaneously, and continuously steering multiple beams of light into arbitrary directions over the full 360° in the azimuth plane and $\pm 2\phi_{ele}$ in elevation.

Yet another object of the present invention is to provide another transmitter having telescope or telescope array to reach diffraction limited beam divergence.

Yet another object of the present invention is to provide a transceiver comprising any one of the said transceivers and an optical receiver or receiver array.

Yet another object of the present invention is to provide a method for fabricating the planar wave guide beam steering device.

BRIEF DESCRIPTION OF THE DRAWINGS

FIG. 16 shows the first step of manufacture by creating a planar light-wave circuit (PLC) with ring-shaped wave guide via the standard foundry procedure in semiconductor industry as shown in.

DETAILED DESCRIPTION OF THE INVENTION

Figure 1:
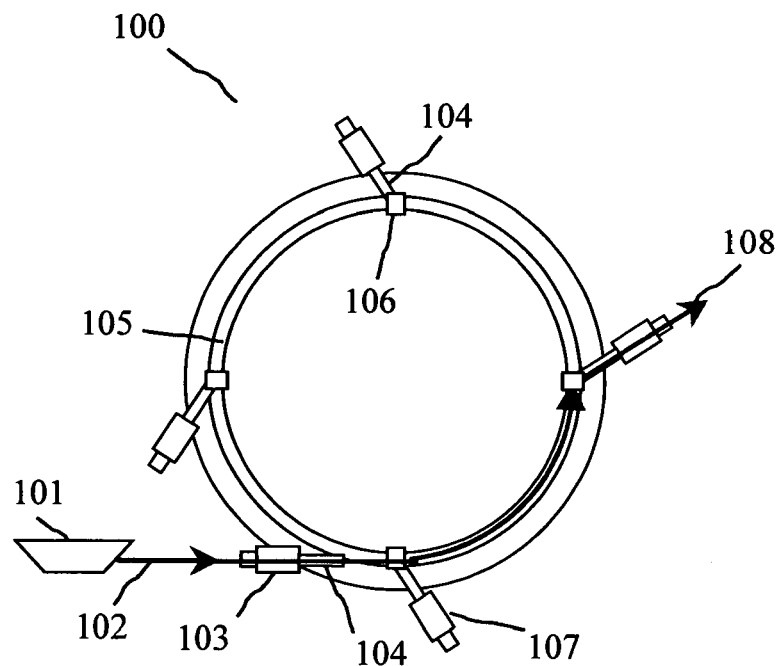
FIG. 1 illustrates the top view structure of the first preferred planar wave guide beam steering device (100) in the first embodiment, which contains a circular wave guide along which there is a plurality of wave guide switching element.

FIG. 1 illustrates the top view structure of the first preferred planar wave guide beam steering device (100) in the first embodiment. The laser beam (102) from a laser (101) is coupled into the input wave guide (104) to become a wave guided beam via the coupling optics (103) such as a fiber with a Grinlens. The wave guided beam is further coupled into the ring-shaped wave guide (105) along which there is a plurality of wave guide switching elements (107). When the wave guide switching elements are in off-state, the wave guided beam passes through the switching elements and continues to travel along the ring-shaped wave guide. Once one of the wave guide switching elements is electrically switched on, the wave guided beam is deflected from the ring-shaped wave guide and become a freely traveling light beam (108) after passing through the output coupling optics (107). In the figure only one output coupling optics (107) is shown as an example.

Figure 2:
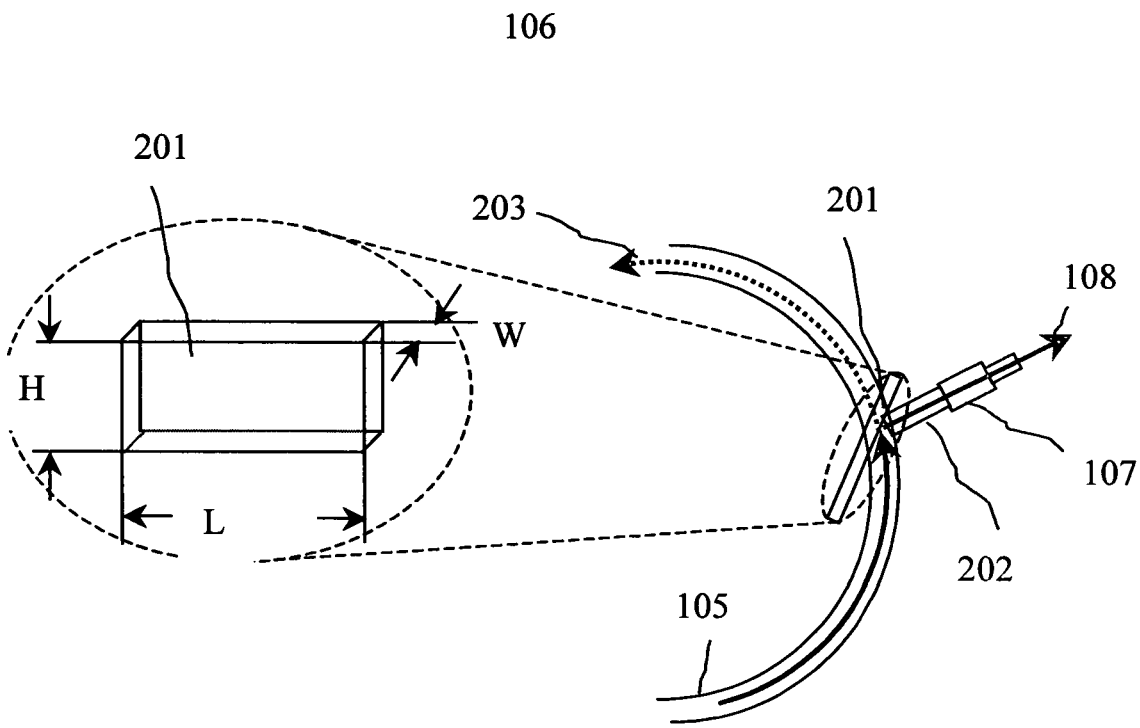
FIG. 2 represents the detailed structure of a wave guide (WG) switching element that consists of ring-shaped wave guide, trench filled with liquid crystal material, output wave guide, and electrodes (not shown in the figure) in direct contact with the liquid crystal material. The insertion in the figure shows the trench physical dimension with a length (L), height (H), and a width (W).

FIG. 2 represents the detailed structure of a wave guide switching element (106). The wave guide switching element consists of ring-shaped wave guide (105), trench (201) filled with liquid crystal material, output wave guide (202), and electrodes (not shown in the figure) in electric contact with the liquid crystal material. In this figure, the wave guide switching element is switched to "ON" state that deflects the wave guided beam from the ring-shaped wave guide (105) to become a freely traveling light beam (108) after passing through the output wave guide (202) and coupling optics (107). The dashed line (203) represents the transmitted wave guided beam when the wave guide switching element is switched to "OFF" state. The insertion in FIG. 2 shows the trench physical dimension with a length (L), height (H), and a width (W).

Figure 3:
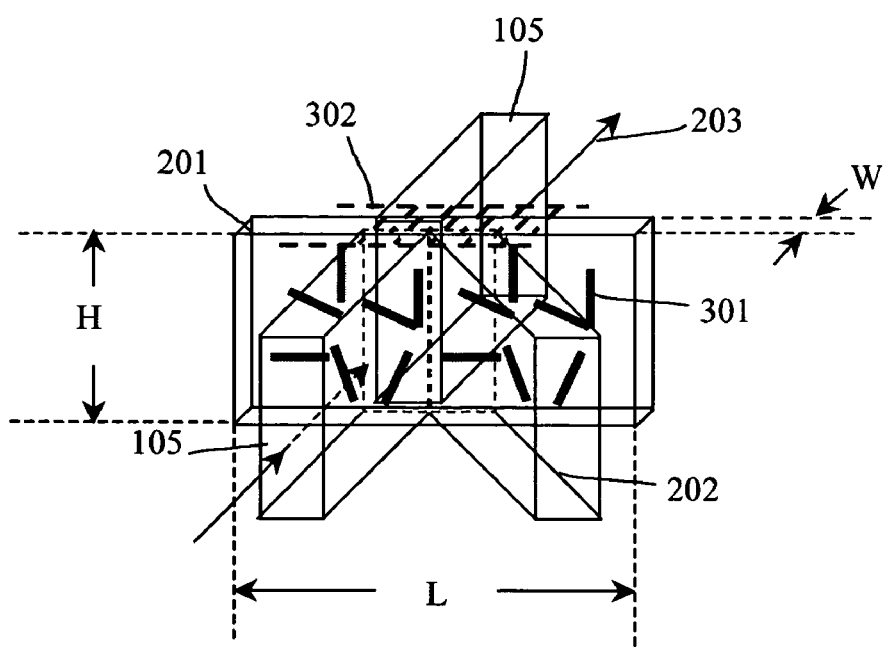
FIGS. 3 illustrates the front view in 3-D of the cross-section of one wave guide switching element in the absence of an electric field.

FIGS. 3 illustrates the front view in 3-D of the cross-section of one wave guide switching element in the absence of an electric field. Above the clearing temperature, the liquid crystal (301) inside the trench (201) is in isotropic state with a refractive index $n_{iso}=[(2n_o^2+n_e^2)/3]^{1/2}$ matching to that of the wave guides (105, 202), where $n_o$ is the liquid crystal ordinary refractive index and $n_e$ is the extraordinary index. The liquid crystal (301) has a positive birefringence $\Delta n=n_o-n_e>0$ and a positive dielectric anisotropy $\Delta\epsilon>0$. The liquid crystal is in direct contact with the electrodes (302) that are Indium-Tin-Oxide (ITO) patterned into comb-like pattern for in-plane switching and are located on the top of the trench (201). Due to the matching index condition between the wave guide and the liquid crystal in isotropic phase, the wave guided beam inside the ring-shaped wave guide passes through the wave guide switching element without loss. The isotropic state of the liquid crystal is realized via either heating the whole planar wave guide beam steering device or locally heating the liquid crystal inside the trench. Since the in-plane switching electrodes are not in the path of the light beam propagation, the optical loss is low and the device is suitable for high power beam.

Figure 4:
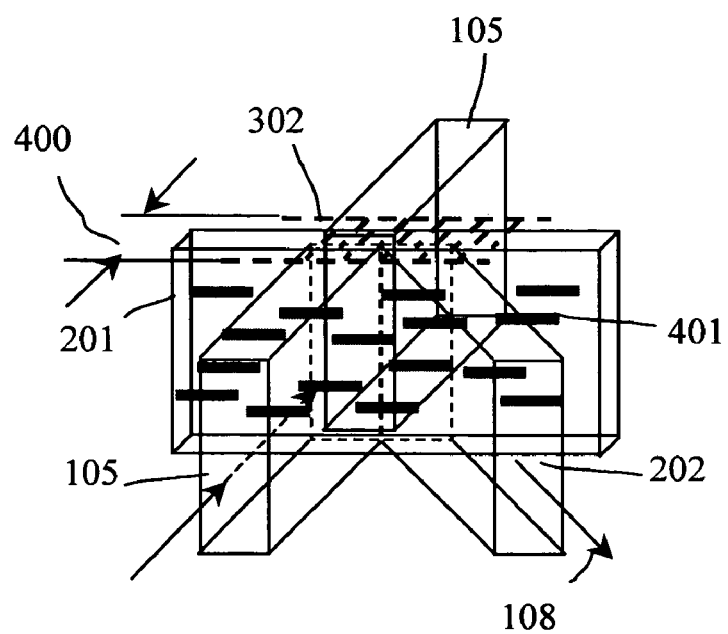
FIGS. 4 illustrates the front view in 3-D of the same cross-section of the wave guide switching element but in the presence of an electric voltage that is applied to the in-plane switching electrodes (302).

FIGS. 4 illustrates the front view in 3-D of the same cross-section of the Wave guide switching element but in the presence of an electric voltage (400) that is applied to the in-plane switching electrodes (302). The applied voltage through the in-plane switching electrodes creates an electric field along the length direction of the liquid crystal trench (201). The electric field aligns liquid crystal (401) into the field-forced nematic phase with their director oriented along the trench length direction since the liquid crystal has a positive dielectric anisotropy. Under this situation, the "S" polarization of the wave guided incident beam that is perpendicular to the liquid crystal molecules experiences a refractive index transition from $n_{iso}$ to $n_o$ that is smaller than $n_{iso}$. If the incident angle is greater than the critical angle for total internal reflection this "S" polarization is reflected via the total internal reflection mechanism from the trench front interface with the incident ring-shaped wave guide (105). For "P" polarization that is nearly but not exactly perpendicular to the LC molecule longer axis, it experiences an index change from $n_{iso}$ to $n_{eff}(n_o \leq n_{eff} < n_e$, and $n_{eff}$ is very close to $n_o$) and is also reflected via the total internal reflection mechanism.

An exemplary liquid crystal is E3100-100 from EM Industries. This liquid crystal has $n_o$=1.497, $n_e$=1.6319. Therefore its $n_{iso}$=1.54328. If the incident angle is chosen to be 76°, $n_{eff}$=1.5006 which is also smaller than $n_{iso}$. Under this condition, total internal reflection takes place at the liquid crystal trench and ring-shaped wave guide interface. In experiment, such switching behavior of the liquid crystal from isotropic state to nematic state, or vice versa, via varying the applied electric field has been confirmed by using the liquid crystal E3100-100 from EM Industries.

The in-plane switching electrodes can also be placed at the bottom of the trench. Or the in-plane switching electrodes can be place on the trench side wall that faces one of the the wave guides.

Figure 5:
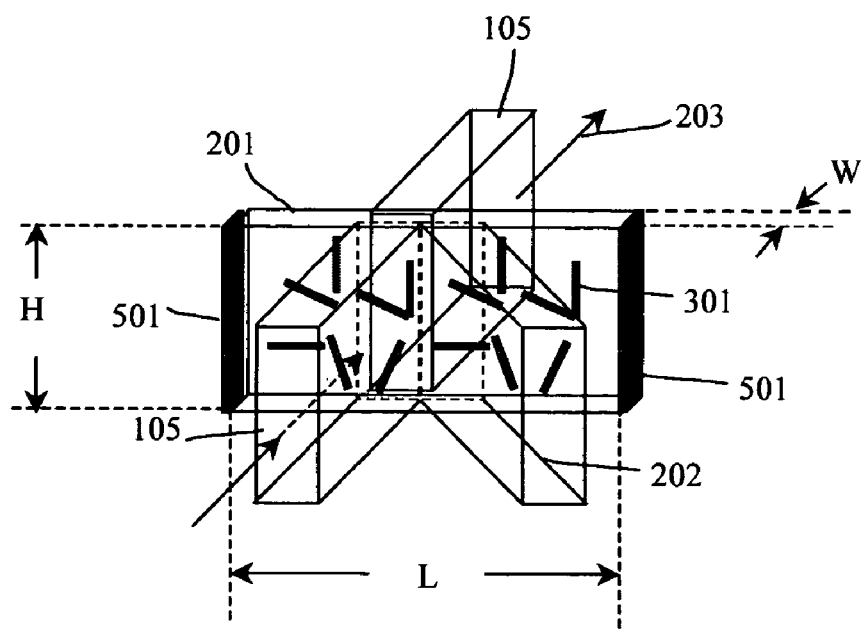
FIG. 5 shows the front view in 3-D of the cross-section of one wave guide switching element with conventional solid electrodes in the absence of an electric field in which the ITO electrodes are located at the two ends of the trench.

In an alternative design, conventional electrodes are used. FIG. 5 shows the front view in 3-D of the cross-section of one wave guide switching element with such electrodes in the absence of an electric field in which the ITO electrodes (501) are located at the two ends of the trench (201). In the absence of an electric field, the liquid crystal in isotropic phase has a refractive index $n_{iso}$ that matches that of the wave guide. Therefore, the wave guided beam inside the ring-shaped wave guide passes through the wave guide switching element without loss. Since the electrodes are not in the path of light beam propagation, the optical loss is low.

Figure 6:
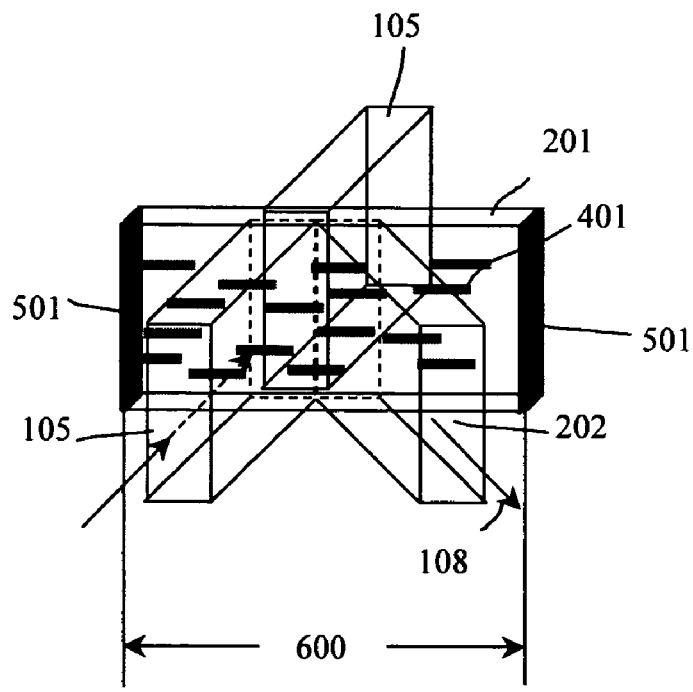
FIGS. 6 illustrates the front view in 3-D of the same cross-section of the wave guide switching element with the conventional solid electrodes but in the presence of an electric voltage. The applied voltage creates an electric field that aligns the liquid crystal into a field-forced nematic phase with their director oriented along the trench length direction.

FIGS. 6 illustrates the front view in 3-D of the same cross-section of the Wave guide switching element with the conventional electrodes but in the presence of an electric voltage (600) that is applied to the electrodes (501). The applied voltage creates an electric field along the length of the liquid crystal trench (201). The electric field aligns liquid crystal (401) into a field-forced nematic phase with their director oriented along the trench length direction since the liquid crystal has a positive dielectric anisotropy. If the incident angle is greater than the critical angle for total internal reflection, both "S" and "P" polarizations of the incident wave guided beam are reflected.

If the liquid crystal has a negative dielectric anisotropy, i.e, $\Delta\epsilon$<0, the paired solid electrodes should be placed either at the top-bottom, or at the front-back interface of the trench. However, in either situation, there should be alignment coatings on either the top-bottom or the front-back walls of the trench so that the liquid crystal longer axis is oriented along the length direction of the trench under an electric field.

In the second preferred embodiment, the planar wave guide beam steering device is made to be polarization sensitive. The wave guide can be either TE- or TM-mode. Any scheme for switching the liquid crystal disclosed in the prior-art (http://people.na.infn.it/~abbate/gruppo/Waveguides.htm) can be adopted. The following lists a few examples.

Figure 7:
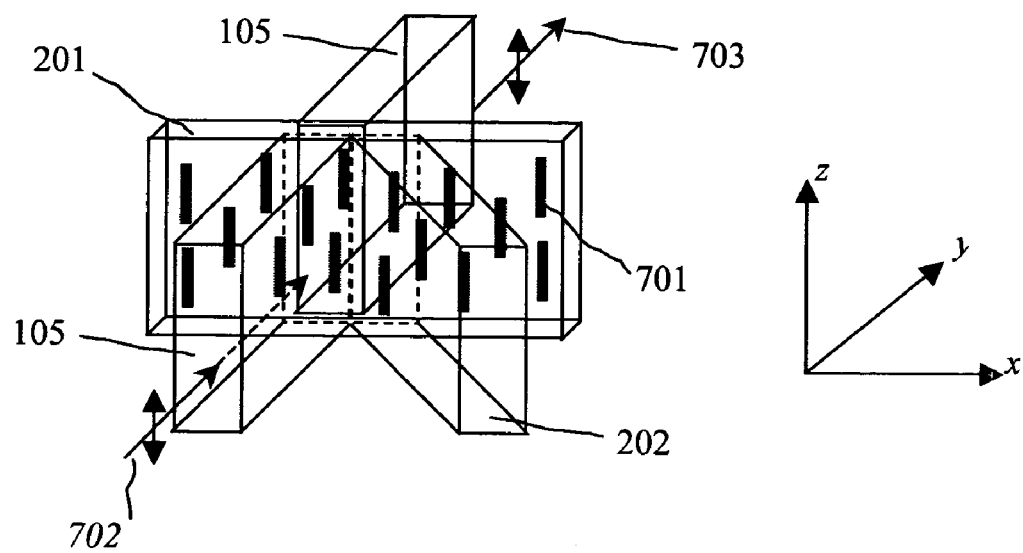
FIG. 7 shows the first example of a wave guide switching element in the TM-mode planar wave guide beam steering device in the absence of an electric field. The liquid crystal is spontaneously oriented with their director along the light polarization direction in the absence of a voltage via the rubbed polyimide coatings.

FIG. 7 shows the first example of a wave guide switching element in the TM-mode planar wave guide beam steering device in the absence of an electric field. The incident wave guided beam (702) is "S" polarized to fit the TM-mode of the wave guide. The liquid crystal (701) is spontaneously oriented with their director along the light polarization direction in the absence of a voltage. The spontaneous alignment is provided by rubbed polyimide coatings for homogeneous alignment on both front and back walls of the trench or by the alignment layers for homeotropic alignment on the top and bottom walls of the trench. Since the incident beam sees the extraordinary index $n_e$ of the liquid crystal that matches the refractive index of the wave guide it passes through the wave guide switching element without loss to become the transmitted beam (703).

Figure 8:
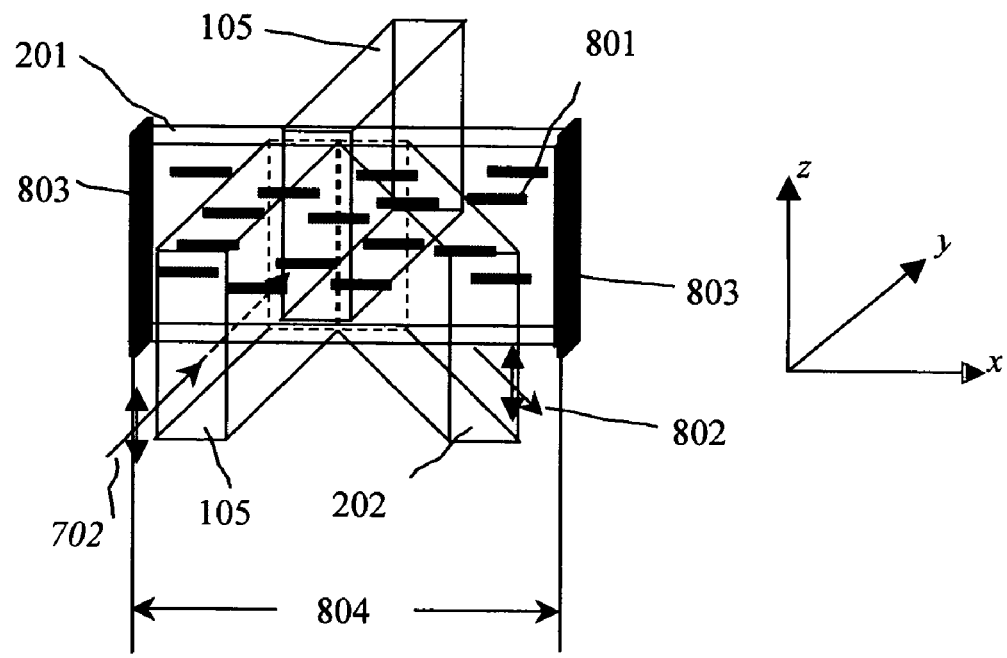
FIG. 8 shows the switching of the wave guide switching element by an electric field the reorients the liquid crystal alignment and switches the light propagation direction.

FIG. 8 shows the switching of the wave guide switching element by an electric field (804). The electric field is created along the "x"-direction by applying an electric voltage (804) to the electrodes (803). Under the electric field, the liquid crystal director of the nematic liquid crystal (801) is reoriented perpendicular to the light polarization. Since the incident "S" polarization beam (702) "sees" a liquid crystal index change from $n_e$ to $n_o$ ($n_o$<$n_e$), total reflection of the incident beam takes place at the trench front interface facing the wave guide if the incident angle is greater than the critical angle for total internal reflection. The reflected beam (802) is traveling inside the output coupling wave guide (202).

Figure 9:
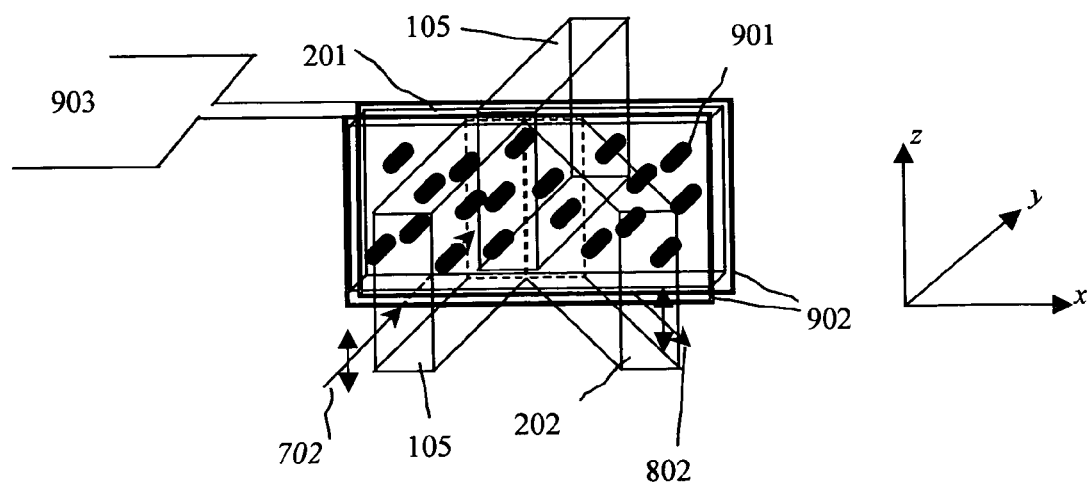
FIG. 9 shows another switching scheme of the wave guide switching element in the TM-mode planar wave guide beam steering device.

FIG. 9 shows another switching scheme of the wave guide switching element in the TM-mode planar wave guide beam steering device. The electrodes (902) are located at the front and back walls of the liquid crystal trench (201) through which an electric voltage (903) is applied. Under this electric field, the liquid crystal (901) is aligned with their director along the "y" direction. Similarly, since the incident "S" polarization beam (702) "sees" a liquid crystal index change from $n_e$ to $n_o$ ($n_o$<$n_e$), total reflection of the incident beam takes place at the front interface between the wave guide and liquid crystal if the incident angle is greater than the critical angle for total internal reflection.

There are other schemes for electrically reorienting or switching nematic liquid crystal. For example, the liquid crystal can be switched via the in-plane switching electrodes that are placed on top of the trench. However, no matter which scheme is adopted, the principle is to switch the liquid crystal from one state whose index matches that of the wave guide to another state whose index is smaller than the wave guide index. This principle is applicable to all planar WG-BSDs that are polarization sensitive or insensitive.

In above embodiments, all the WG-BSDs are digital beam steering devices for coarse beam steering within the azimuth plane because the wave guide switching elements are discretely distributed along the ring-shaped wave guide in the WG-BSD. To construct a transmitter that is capable of continuously steering a beam of light over the entire azimuth plane, fine beam steering device(s) is required.

Figure 10:
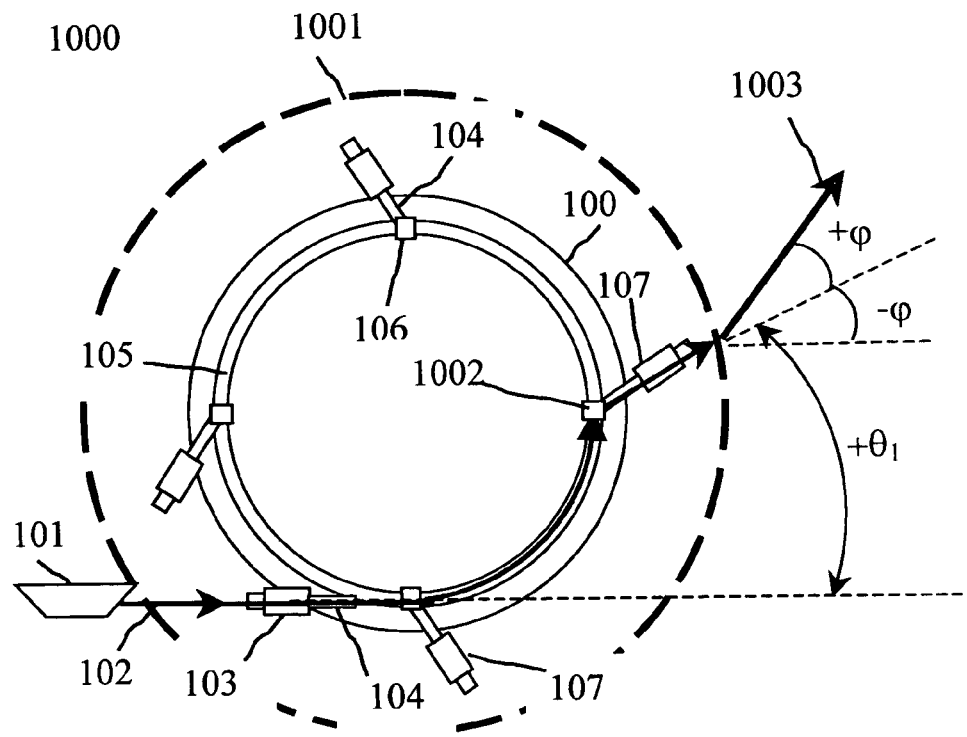
FIG. 10 shows the first preferred configuration of a transmitter that comprises of digital WG-BSD and liquid crystal optical phased array beam steering device (LCOPA BSD) in cylinder that is able to continuously steer a beam of light over an angular span of $\pm\phi$ within the azimuth plane. This transmitter is able to steer a beam of light continuously with the whole azimuth plane.

FIG. 10 shows the first preferred configuration of the transmitter (1000) in the present invention that comprises of digital WG-BSD (100) and fine beam steering device (1001). In the figure, the fine beam steering device (1001) is liquid crystal optical phased array beam steering device (LCOPA BSD) in cylinder structure. The LCOPA BSD is able to continuously steer a beam of light over an angular span of $\pm\phi$. At $t_1$ time, the $i^{th}$ Wave guide switching element (1002) on the WG-BSD is switched so that the wave guided laser beam is steered/deflected from the ring-shaped wave guide (105) into an angle "$\theta_1$". Altering the voltage applied to the LCOPA BSD will further scan the deflected laser beam (1003) over the angular span from "$\theta_1-\phi$" "$\theta_1+\phi$". At another time t=$t_2$, the $j^{th}$ switching element on the WG-BSD is switched on so that the laser beam is steered into another angle vicinity "$\theta_2\pm\phi$". Therefore, a continuous steering of a beam of light is realized over the entire 360° in the azimuth plane.

Figure 11:
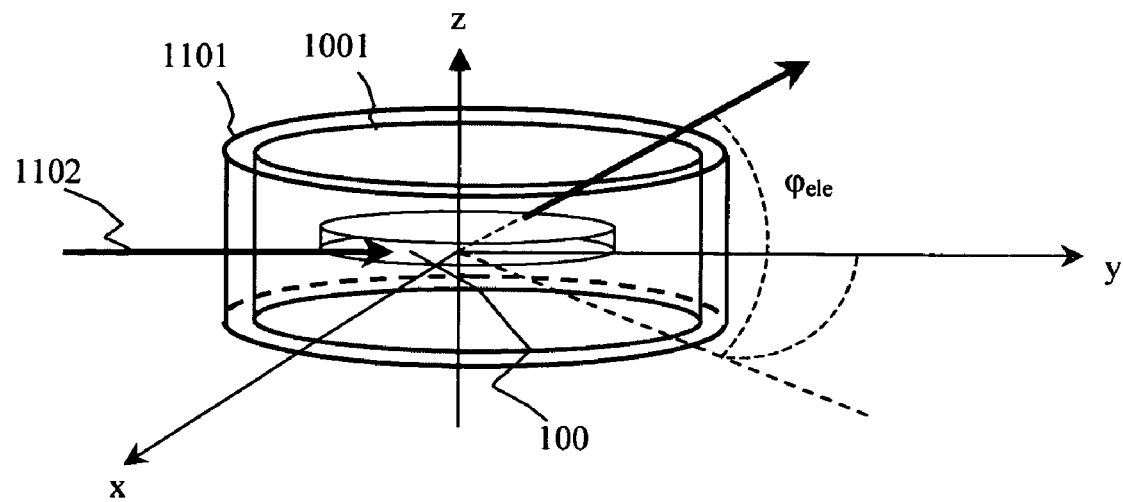
FIG. 11 shows an exemplary transmitter comprising the wave guide beam steering device, the first liquid crystal optical phased array beam steering device for horizontal steering and second liquid crystal optical phased array beam steering device for elevation steering. This transmitter is able to continuously steer a beam of light into an angular direction of ($\phi_{azi}$, $\phi_{ele}$), where ($\phi_{azi}$ is the azimuth (horizontal) steering angle and $\phi_{ele}$ is the elevation steering angle.

A transmitter capable of steering a beam of light in both azimuth and elevation is more desired, which can be realized by incorporating a second fine beam steering device that steers the beam of light in elevation direction. FIG. 11 shows an exemplary transmitter comprising the wave guide beam steering device (100), the first LCOPA BSD (1001) for horizontal steering and second LCOPA BSD (1101) for elevation steering. The optical axis of the second LCOPA BSD (1101) is perpendicular to the first LCOPA BSD (1001). The incident beam (1102) is steered into an angular direction of $(\phi_{azi}, \phi_{ele})$ after passing through the transmitter, where $\phi_{azi}$ is the azimuth (horizontal) steering angle and $\phi_{ele}$ is the elevation steering angle.

Figure 12:
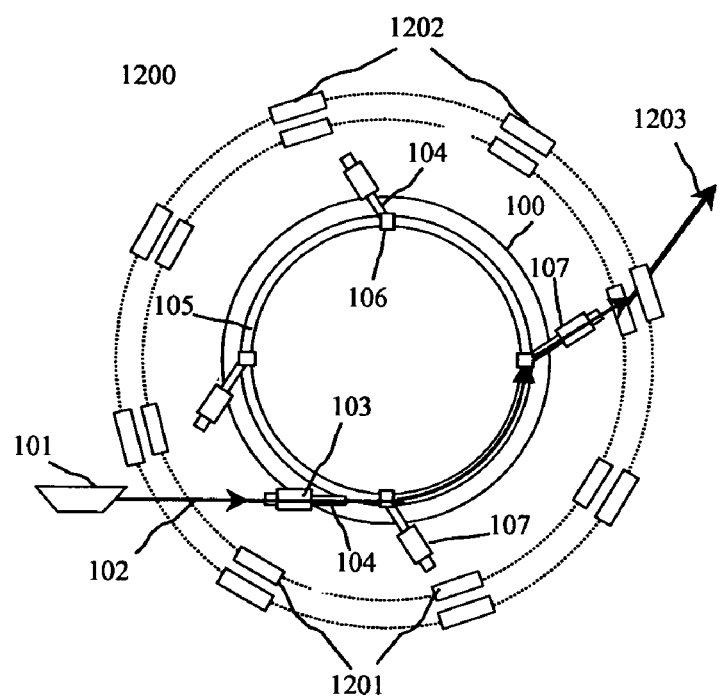
FIG. 12 shows another preferred design of a transmitter where a plurality of discrete fine beam steering devices are used in place of the cylindrical-shaped fine beam steering devices for steering a beam of light into an angle of $\phi_{azi}$, $\phi_{ele}$.

In another preferred design, a plurality of discrete fine beam steering devices are used in place of the cylindrical-shaped fine beam steering devices, as shown in FIG. 12. The transmitter (1200) has a WG-BSD that has eight discrete wave guide switching elements (106). Corresponding to each steered beam from a given wave guide switching element in the WG-BSD, there is a first fine beam steering device (1201) for azimuth steering and a second fine beam steering device (1202) for elevation steering. Both fine steering devices (1201, 1202) can have a multi-stage configuration. The steering angle of the exiting beam (1203) is $[\phi_{azi}, \phi_{ele}]$.

Current state-of-the-art or commercial available stationary electro-optical fine beam steering device has a limited steering angle that is less than 90°. In order to increase the elevation steering angle $\phi_{ele}$ to 90° more stages of fine beam steering device are demanded at the penalty of a decreased efficiency. The next embodiment shows an invention that doubles the elevation steering angle without requiring more stages of fine bean steering devices.

Figure 13:
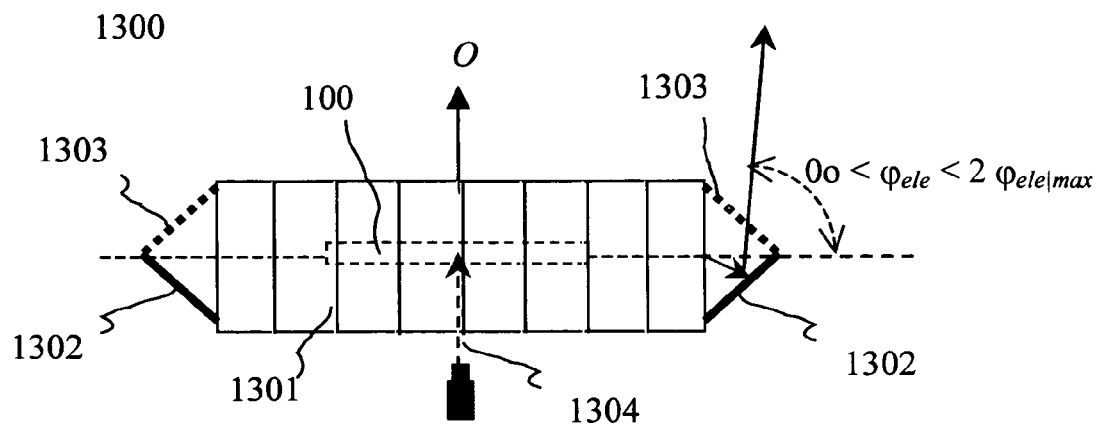
FIG. 13 shows a transmitter comprising a WG-BSD, series of fine beam steering devices and switchable mirrors in ring shape surrounding the WG-BSD and fine BSDs in order to further expand the steering angle in elevation.

FIG. 13 shows a transmitter (1300) comprising a WG-BSD (100), series of fine beam steering devices (1301) and switchable mirrors (1302, 1303). The switchable mirrors are in ring shape surrounding the WG-BSD and fine BSDs. A laser beam (1304) is vertically coupled into the WG-BSD. Assume the lower mirror (1302) is switched into reflection state while the upper mirror (1303) is in transparent state. When the exiting laser beam from the fine beam steering devices (1301) hits the lower mirror (1302) at a minus elevation angle ($\phi_{ele}<0°$) it is reflected into positive elevation angle ($\phi_{ele}>0°$). If the mirror (1302) is properly oriented, the steered beam can be reflected into an elevation angle ($\phi_{ele}$) of $0<2\phi_{ele|max}$, where $\phi_{ele|max}$ is the upper limit of the elevation steering angle of the fine BSD. Similar argument holds for the exiting laser beam from the fine beam steering devices (1301) that hits the upper mirror (1303) at a plus elevation angle ($\phi_{ele}>0°$). At this time, this beam is reflected into negative elevation angle ($\phi_{ele}<0°$) if the lower mirror (1302) is in transparent state while the upper mirror (1303) is in reflection state. In brief, in order to steer a beam of light into the upper semi-solid angle ($\phi=360°, 0°<\phi_{ele}\leq 2\phi_{ele|max}$), the upper mirror (1303) is switched into transparent state while the lower mirror (1302) is in the reflection state. Vice versa, in order to steer a beam of light into the lower semi-solid angle ($\phi=360°, -2\phi_{e|max}<\phi<0°$) the upper mirror (1303) is in reflective state while the lower mirror (1302) is in transparent state. These switchable mirrors can be constructed from conventional cholesteric liquid crystal (CLC) or broadband CLC materials.

Figure 14:
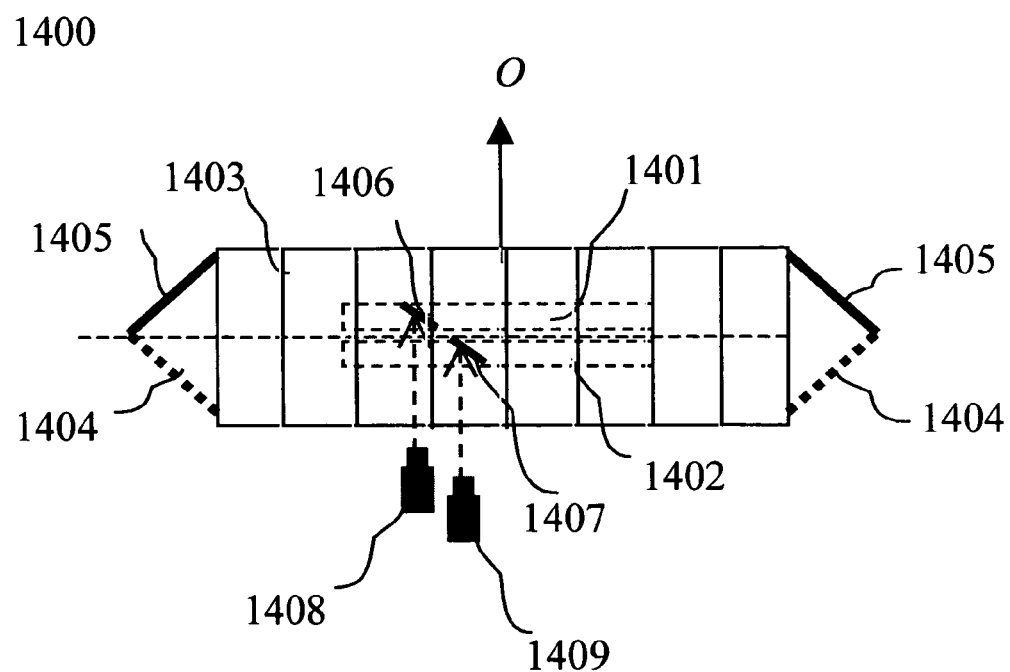
FIG. 14 shows the cross-section of an exemplary design of a transmitter capable of simultaneously steering two beams of light into separate directions. The transmitter consists of two WG-BSDs preferably in stack arrangement and pixilated LCOPA BSDs as well as pixilated switchable mirrors.

In the following embodiment, description is given to a preferred design for a transmitter capable of simultaneously steering multiple beams of light into separate directions. FIG. 14 shows the cross-section of an exemplary design of a transmitter (1400) that consists of two WG-BSDs (1401, 1402) preferably in stack arrangement and pixilated LCOPA BSDs (1403) as well as pixilated lower and upper switchable mirrors (1404, 1405). The two laser beams (1408, 1409) are vertically coupled into the WG-BSDs through the coupling element (1406, 1407) imbedded in the WG-BSDs. The two laser beams can come from two separate lasers or one laser via a beam splitter.

Figure 15:
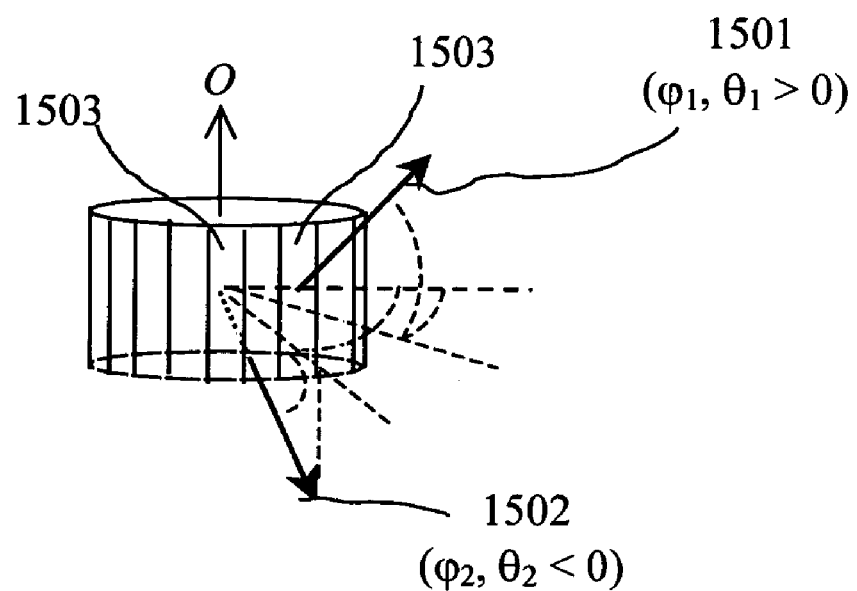
FIG. 15 shows that pixilating the cylindrical LCOPA fine BSDs enables to independently steering multiple beams.

In order to independently steer multiple beams, the cylindrical LCOPA fine BSDs are preferred to be pixilated. FIG. 15 shows that each pixel in LCOPA BSDs consists of sub-pixels for creating the phase array. In an exemplary operation, the two laser beams are vertically coupled into the upper and lower WG BSD, respectively. Switch the liquid crystal element in the upper WG BSD such that it steers the first laser beam (1501) to hit the $i^{th}$ pixel (1503) of the LCOPA BSDs. By modulating the $i^{th}$ pixel of the fine LCOPA BSDs and the corresponding mirror element, this laser beam (1501) is steered into the direction of $(\phi_1, \theta_1>0)$. At the same time, one of the liquid crystal elements in the lower WG BSD is switched such that it steers the second laser beam (1502) to hit the $j^{th}$ pixel (1504) of the fine BSDs. By similarly modulating the $j^{th}$ pixel (1504) of the fine BSDs and the corresponding mirror element, this laser beam (1502) is independently steered into another direction of $(\phi_2, \theta_2<0)$. Since all the pixels in the fine LCOPA BSD array are independently addressed, the two laser beams are independently steered. Correspondently, the mirrors should also be pixilated for arbitrarily steering multiple beams.

The angular separation between the two beams can be precisely, arbitrarily, and continuously varied from 0° to any value within the full field of regard of this transmitter device. It is pointed out that the pixilated LCOPA BSDs can be replaced by a plurality of other isolated BSDs for fine beam steering.

Finally, but not lastly, an optional optical receiver is integrated, making the transmitter a transceiver. In a preferred arrangement, the receiver is integrated in the center of the wave guide beam steering device. The receiver can be a quadrant Focal Plane Array (FPA) that acts as both a bearing detector and for detecting digital transmissions. The FPA has a FOV sufficiently wide to cover the full search field, which is on the order of a radian in each angular dimension. Hence, the receiving party does not have to scan the receiver aperture to acquire the transmitting party.

In the following, an exemplary design is presented to the wave guide beam steering device, which has been accomplished via a computer modeling using the software of BeamPROP (Version 5.0a) from RSoft Design Group, Inc. The following lists the parameters for the exemplary WG-BSD design.

1. The proper radius diameter of the ring-shaped wave guide is 20 mm or larger

2. The preferred liquid crystal is E3100-100 from EMI ($n_o=1.5141, n_e=1.6849$)

3. The wave guide (WG) index is 1.54328

4. The cladding index is 1.5371

5. The wave guide width is 11.0 µm

6. The wave guide depth is 5.5 µm

7. The trench width is 5.5 micron

8. The trench depth is 9.25 micron

9. The trench angle with the wave guide is 9.8°

This computer simulation proves that in the absence of an electric field, the un-polarized wave guided laser beam passes through the wave guide switching element and continues traveling within the ring-shaped wave guide without loss. Once one of the wave guide switching elements is electrically switched, more than 99.9% of the energy of the un-polarized wave guided laser beam is deflected from the ring-shaped wave guide by the wave guide switching element.

Using liquid crystal that is set above the clearing temperature has advantage for achieving a fast response speed. In experiment, it has been proven that electro-optical response time of the nematic liquid crystal reaches below 100 microseconds. Such a short response time originates from the lower viscosity of the nematic in the isotropic state.

In the following embodiment, anticipated fabrication procedures are presented to the wave guide beam steering device. The WG-BSDs can be fabricated via the standard semiconductor wafer procedures and liquid crystal display fabrication procedures.

Figure 16:
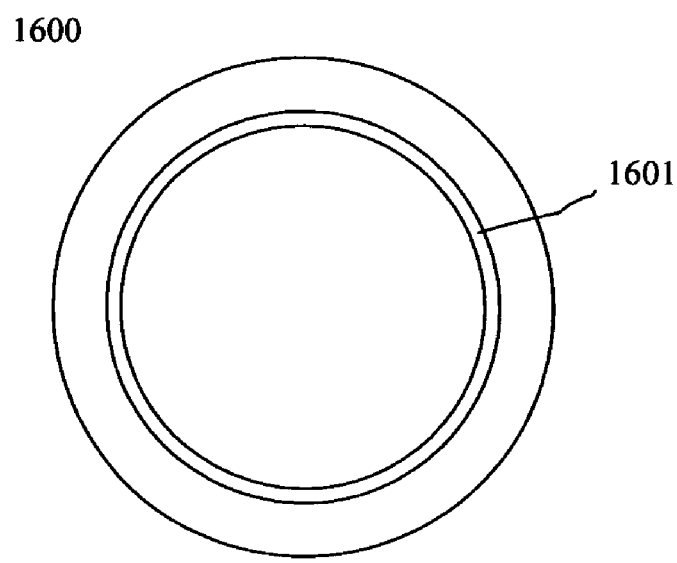

Step 1. Create a planar light-wave circuit (PLC) (1600) with ring-shaped wave guide (1601) via the standard foundry procedure in semiconductor industry as shown in FIG. 16.

Figure 17:
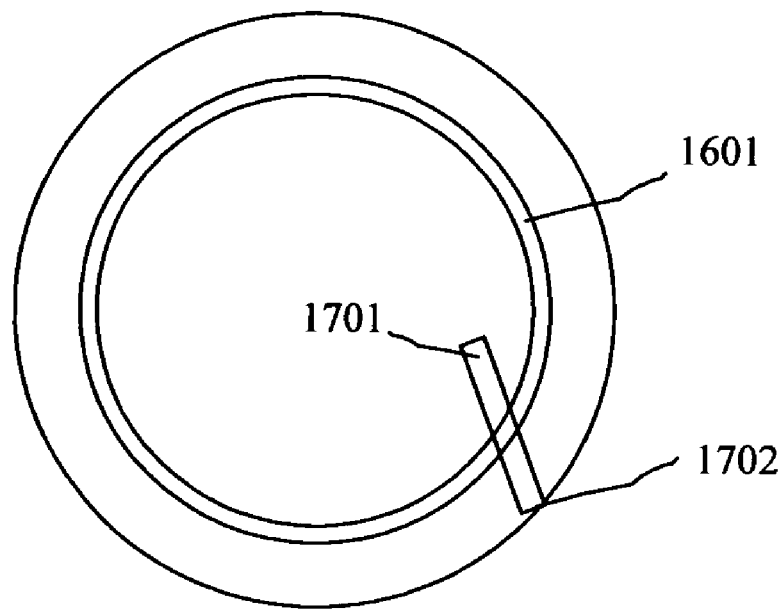
FIG. 17 shows the second step of manufacture by etching trenches across the ring-shaped wave guide via the standard photolithographic method, where only one trench is illustrated as an example with an opening.

Step 2. Etch trenches (1701) across the ring-shaped wave guide via the standard photolithographic method, as shown in FIG. 17 where only one trench (1701) is illustrated as an example with an opening (1702).

Step 3. Select a second substrate with an electrically conductive coating such as ITO.

Figure 18:
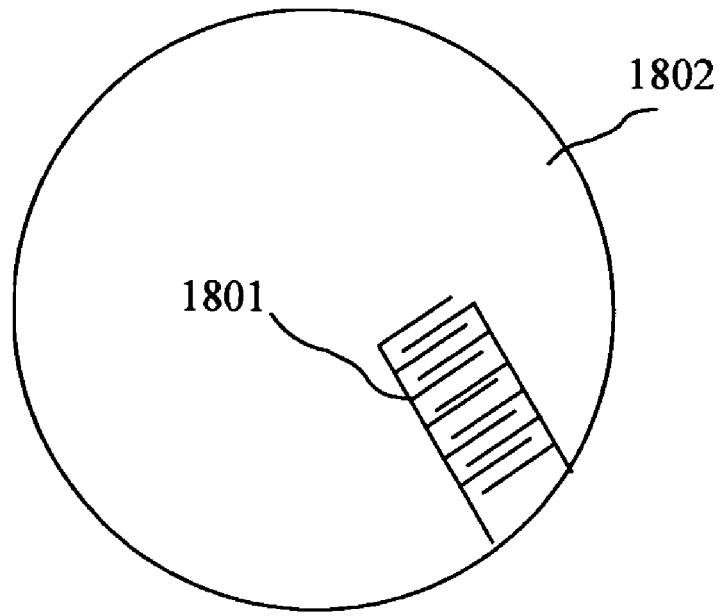
FIG. 18 shows the third step of manufacture by patterning the conductive coating such as the ITO into in-plane switch electrodes on a second substrate.

Step 4. Pattern the conductive coating such as the ITO into in-plane switch electrodes (1801) on the second substrate (1802), as shown in FIG. 18.

Figure 19:
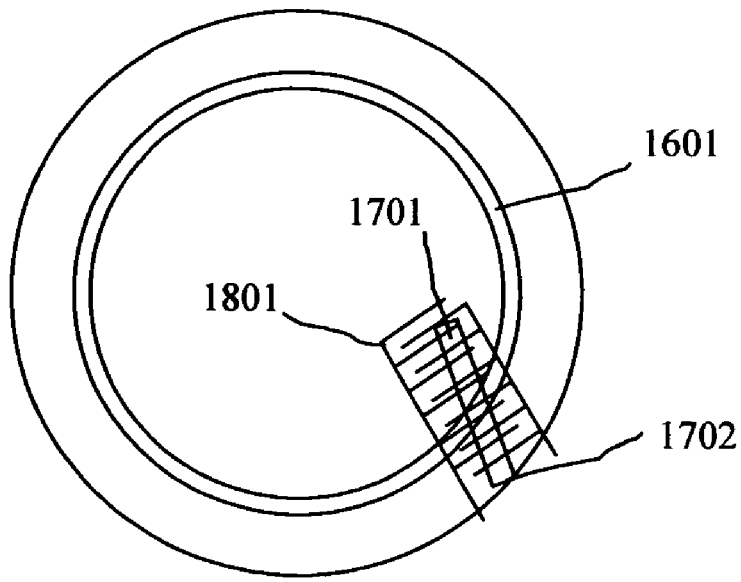
FIG. 19 shows the forth step of manufacture by covering the PLC with the second substrate having the patterned electrodes.

Step 5. Cover the PLC (1600) with the second substrate (1802) with the patterned electrodes (1801), as shown in FIG. 19.

Figure 20:
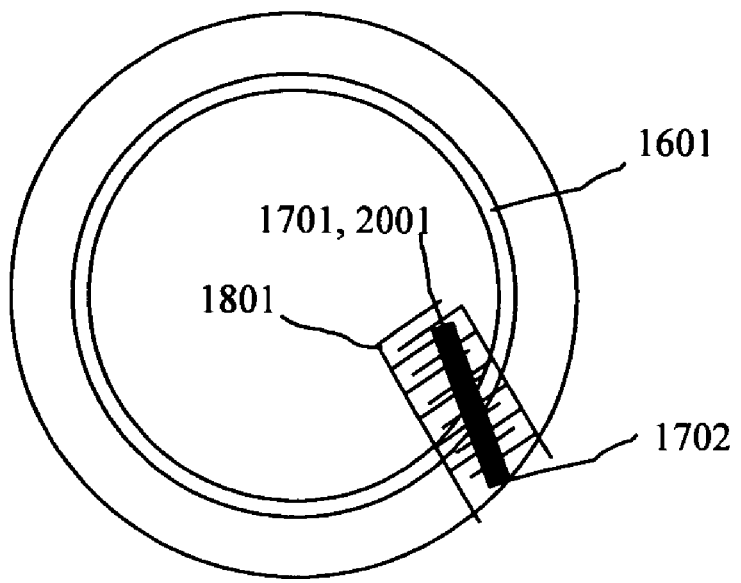
FIG. 20 shows the fifth step of manufacture by vacuum-filling the liquid crystal into the trenches through the openings at the edge of the PLC.

Step 6. Vacuum-fill the liquid crystal (2001) into the trenches (1701) through the openings (1702) at the edge of the PLC (1600), as shown in FIG. 20.

Step 7. Finally, seal the openings (1702).

Similar structures, assembly methods and materials could also be used to construct the alternative embodiments disclosed in other figures of drawing, layouts, configurations and combinations that are apparent to those skilled in the art.

This invention provides an optical transmitter device that is capable of efficiently directing or steering multiple optical beams of light into arbitrary directions with a wide field of regard. The center part of the invented transmitter is the wave guided liquid crystal beam steering device(s) that when in series with a plurality of state-of-the-art fine steering devices as well as a plurality of switchable mirrors enables the transmitter to steer multiple beams of light with a FOR close to 4π. This invention further provides detailed configurations of the wave guided beam steering devices that are either polarization sensitive or insensitive. Moreover, this type of wave guide beam steering device is also suitable for integration with other silica-on-silicon devices to provide optical beam routing, switching, and re-direction functionality. Moreover, preferred fabrication procedures are suggested for the wave guided liquid crystal beam steering device.

While the present invention has been described in terms of some special examples and has been illustrated in some specific embodiments, it is clear that this invention is not solely limited to these specific examples and embodiments, and that many alternations and modifications will be apparent to those skilled in the field without departing from the true spirit and scope of the invention. It is therefore intended that the appended claims be construed broadly to cover all embodiments that fall within the scope of the invention.

What is claimed is:

1. An apparatus, comprising:
   a polarization insensitive wave guide switching means, comprising:
   a wave guide substrate;
   at least one planar wave guide attached to the wave guide substrate;
   a liquid crystal material attached to the wave guide substrate, the liquid crystal material in operative optical contact with the at least one planar wave guide, the liquid crystal material having a first and second state, wherein the index of refraction of the liquid crystal material in the first state matches the index of refraction of the at least one planar wave guide, and wherein the index of refraction of the liquid crystal material in the second state does not match the index of refraction of the at least one planar wave guide;
   a means for applying an electric field across the liquid crystal material, wherein the liquid crystal material switches between the first state mid the second state as the electric field is applied;
   wherein a beam of light in any polarization propagating in the wave guide is not reflected when the beam of light in any polarization reaches the liquid crystal material in the first state, and wherein the beam of light in any polarization is reflected when the liquid crystal material is in the second state.

2. The wave guide switching element according to claim 1 wherein the first state of the liquid crystal material is an isotropic state and the second state of the liquid crystal material is a nematic state.

3. The wave guide switching element according to claim 2 wherein the nematic state of the liquid crystal material is a field-forced nematic state.

4. The wave guide switching element according to claim 1 wherein the first state of the liquid crystal material is a nematic state and the second state of the liquid crystal material is a nematic state.

5. The wave guide switching element according to claim 1 wherein the liquid crystal material is contained inside a trench.

6. The wave guide switching element according to claim 5 wherein the trench intersects the at least one planar wave guide.

7. The wave guide switching element according to claim 5 wherein the trench intersects the at least one planar wave guide at an angle greater than the critical angle for total internal reflection when the liquid crystal material is in the second state.

8. The wave guide switching element according to claim 1 wherein the means for applying an electric field across the liquid crystal material is a pair of electrodes.

9. The wave guide switching element according to claim 8 wherein the pair of electrodes is in electric connection with the liquid crystal material.

10. The wave guide switching element according to claim 8 wherein the pair of electrodes is made from Indium-Tin-Oxide.

11. The wave guide switching element according to claim 8 wherein the pair of electrodes is in-plane switching electrodes, the pair of the in-plane switching electrodes switches the liquid crystal material in plane.

12. The wave guide switching element according to claim 11 wherein the in-plane switching electrodes are at the top of the liquid crystal material.

13. The wave guide switching element according to claim 1 further comprising;
   a cover substrate.

14. The wave guide switching element according to claim 13 wherein the cover substrate has a first and second surface.

15. The wave guide switching element according to claim 14 wherein the first surface of the cover substrate contacts the wave guide surface of the wave guide substrate.

16. The wave guide switching element according to claim 15 wherein the first surface of the cover substrate contains a pair of in-plane switching electrodes.

17. The wave guide switching element according to claim 1, further comprising;
an alignment layer, the alignment layer contacting the liquid crystal material.

18. The wave guide switching element according to claim 17 wherein the alignment layer is for homogeneous alignment of the liquid crystal material.

19. The wave guide switching element according to claim 17, wherein the alignment layer is for homeotropic alignment of the liquid crystal material.

20. The wave guide switching element according to claim 1 wherein the beam of light is linearly polarized.

21. The wave guide switching element according to claim 1 wherein the beam of light is circularly polarized.

22. The wave guide switching element according to claim 1 wherein the beam of light is randomly polarized.

23. The wave guide switching element according to claim 1 wherein the beam of light is reflected via total internal reflection when the liquid crystal material is in the second state.

24. A method for producing a polarization insensitive wave guide switching element, comprising:
a) providing a wave guide substrate;
b) attaching at least one planar wave guide to the wave guide substrate;
c) attaching a liquid crystal material to the wave guide substrate, the liquid crystal material in operative optical contact with the at least one planar wave guide, the liquid crystal material having a first and second state, wherein the index of refraction of the liquid crystal material in the first state matches the index of refraction of the at least one planar wave guide and wherein the index of refraction of the liquid crystal material in the second state does not match the index of refraction of the at least one planar wave guide; and
d) providing a means for applying an electric field across the liquid crystal material, wherein the liquid crystal material switches between the first state and the second state as the electric field is applied,
wherein a beam of light in any polarization propagating in the wave guide is not reflected when the beam of light in any polarization reaches the liquid crystal material in the first state, and wherein the beam of light in any polarization is reflected when the liquid crystal material is in the second state.

25. The method of claim 24 wherein step b) comprises:
providing the at least one planar wave guide with a curvature path for propagation of the beam of light.

26. The method of claim 25 wherein the step of providing the at least one planar wave guide comprises:
providing the at least one planar wave guide with a curvature path for propagation of the beam of light in linear polarization.

27. The method of claim 25 wherein the step of providing the at least one planar wave guide comprises;
providing the at least one planar wave guide with a curvature path for propagation of the beam of light in circular polarization.

28. The method of claim 25 wherein the step of providing the at least one planar wave guide comprises;
providing the at least one planar wave guide with a curvature path for propagation of the beam of light in random polarization.

29. The method of claim 24, further comprising;
e) bonding a cover substrate having opposed first and second surfaces to the wave guide surface of the wave guide substrate, the first surface of the cover substrate contacting the wave guide surface of the wave guide substrate.

30. The method of claim 29, wherein step e) further comprises;
providing a pair of electrodes on the first surface of the cover substrate contacting the wave guide surface of the wave guide substrate.

31. The method of claim 30, wherein the pair of electrodes is in-plane switching electrodes, the pair of in-plane switching electrodes switching the liquid crystal material in plane.

32. The method of claim 29, wherein step e) further comprises;
providing an alignment layer on the first surface of the cover substrate contacting the wave guide surface of the wave guide substrate.

33. The method of claim 24 wherein step c) comprises;
c1) providing a trench in the wave guide substrate, wherein the trench cuts the planar wave guide; then
c2) filling the trench with a liquid crystal material.

34. The method of claim 33, wherein step c1) further comprises;
providing the trench, wherein the trench intersects the at least one planar wave guide at an angle greater than the critical angle for total internal reflection, wherein the beam of light is reflected via total internal reflection when the liquid crystal material is in the second state.

35. The method of claim 33, wherein step c1) further comprises;
providing an alignment layer on walls of the trench.

36. The method of claim 33, wherein step c1) further comprises;
providing electrodes on walls of the trench.

37. The method of claim 24, wherein step d) comprises;
providing a pair of electrodes, wherein the pair of electrodes is in electrical connection with the liquid crystal material.

38. The method of claim 37, wherein the pair of electrodes is in-plane switching electrodes, the pair of in-plane switching electrodes switching the liquid crystal material in plane.

39. The method of claim 24, further comprising
f) providing an alignment layer on the waveguide substrate, the alignment layer in direct contact with the liquid crystal material.

* * * * *